United States Patent [19]

Haun

[11] Patent Number: 5,294,573
[45] Date of Patent: Mar. 15, 1994

[54] SOL-GEL PROCESS OF MAKING GRADIENT-INDEX GLASS

[75] Inventor: Niels Haun, Rochester, N.Y.

[73] Assignee: University of Rochester, Rochester, N.Y.

[21] Appl. No.: 83,031

[22] Filed: Jun. 25, 1993

[51] Int. Cl.⁵ .............................................. C03C 3/04
[52] U.S. Cl. ......................................... 501/12; 501/54; 501/65; 501/66; 501/67; 501/68
[58] Field of Search ..................... 501/12, 54, 65, 66, 501/67, 68

[56] References Cited

U.S. PATENT DOCUMENTS

| | | | |
|---|---|---|---|
| 4,686,195 | 8/1987 | Yamane | 501/12 |
| 4,797,376 | 1/1989 | Caldwell et al. | 501/12 |
| 4,902,650 | 2/1990 | Caldwell et al. | 501/12 |
| 5,068,208 | 11/1991 | Haun et al. | 501/12 |
| 5,196,382 | 3/1993 | Hench et al. | 501/12 |
| 5,238,880 | 8/1993 | Inami et al. | 501/12 |

OTHER PUBLICATIONS

Mukherjee, S. P., "Gradient Index Lens Fabrication Processes: A Review, in Topical Meeting on Gradient-Index Optical Imaging" Systems, Honolulu, Hi., Optical Society of America (May 1981), pp. Tu Al-1 to Tu Al-5.

M. Yamane et. al, "Gradient-Index Glass Rods of PbO·K₂O·B₂O₃·SiO₂ System Prepared by the Sol-Gel Process," *Journal of Non-Crystalline Solids*, 100, 506–10 (1988).

Shingyouchi et. al., *Electronics Letters*, 22:99–100, 1108–1110 (Oct. 1986).

Primary Examiner—Karl Group
Assistant Examiner—Chris Gallo
Attorney, Agent, or Firm—Martin LuKacher; Michael L. Goldman

[57] ABSTRACT

The present invention relates to a process for making glass by a sol-gel process. The process is initiated by forming a mixture of silicon alkoxide and an alcohol in a solution sufficiently acidic to partially hydrolyze the silicon alkoxide. An index modifying metal alkoxide selected from the group consisting of alkoxides of titanium and zirconium is then added to the mixture. Water is next added to convert the metal alkoxides to a network of corresponding metal oxides suitable for gelation. The mixture containing the network of metal oxides is then contained for sufficient time to form a gel. The gel is acid leached for enough time to remove some of the index modifying metal oxide. To prevent further removal of index modifying metal oxide from the gel, the gel is fixed. The fixed gel is then rinsed with a solvent to remove precipitates from the gel, dried, and sintered into a transparent gradient-index glass. In another aspect of the present invention, the fixing agent can be acetone or a mixture of water and acetone.

34 Claims, No Drawings

SOL-GEL PROCESS OF MAKING GRADIENT-INDEX GLASS

FIELD OF THE INVENTION

The present invention relates to a method of making optical elements from an alkoxide containing mixture in which the index of refraction profile can be varied. The invention is particularly suitable for making gradient index glass with three or more constituents, such as a ternary system formed from a silicon alkoxide, a titanium alkoxide, and an aluminum alkoxide.

BACKGROUND OF THE INVENTION

Gradient-index glass is often made in the form of solid cylindrical bodies. The index of such bodies changes radially, usually with the highest index being along the axis of the cylinder and the lowest index located at the outer periphery.

Generally, the profile of a radial gradient-index glass can be mathematically expressed in terms of the following formula:

$$n = N + N_{00} + N_{10}r^2 + N_{20}r^4...,$$

where:
- n is the refractive index,
- r is the radial distance from the axis of the glass to its periphery, and
- $N_{00}$, $N_{10}$, and $N_{20}$ are constants.

Parabolic gradient profile shapes are particularly desirable for gradient index glass used in lenses, and, for such configurations, the above formula simplifies to the following:

$$n = N_{00} + N_{10}r^2.$$

In defining the profile shape of gradient index glass, the $N_{10}$, $\Delta n$, and % $\Delta n$ due to $N_{10}$ (i.e., $(N_{10}r^2_{periphery}/\Delta n) \times 100$) parameters are particularly important. $\Delta n$ is defined as the difference between the refractive index at the periphery and the axis of the glass. For a parabolic glass configuration, $\Delta n$ is $N_{10}$ ($r^2_{periphery} - r^2_{axis}$), where $r_{axis}$ is zero. The optical power contributed by gradient index glass is dictated by the value of $N_{10}$, with $N_{10}$ values less than 0 indicating a positive optical power. The more negative $N_{10}$ is, the more optical power is introduced. The %$\Delta n$ due to the $N_{10}$ term is a primary indicator of the parabolic character of a particular gradient index glass. As the %$\Delta n$ due to the $N_{10}$ term approaches 100%, the particular glass assumes a more parabolic configuration.

The use of gradient index glass in optical elements provides many advantages over homogeneous glass bodies in which the index is constant. For example, a single gradient index glass element provides the performance of multiple element lenses and reduces the volume of the body. The applications for gradient-index glass have, however, been limited by the lack of suitable materials and of suitable production techniques. For example, the limitations of ion exchange processes relate to size, environmental and thermal stability, index profile dispersion, base index (i.e., $N_{00}$), and maximum $\Delta n$.

Historically, gradient index glass has been made with silicate preforms. See, e.g., U.S. Pat. Nos. 3,938,974 and 4,302,231. These preforms are fabricated either by leaching a phase separated glass or by sol gel methods. Such techniques involve creating and then fixing into place a concentration gradient of refractive index modifying dopants within the porous preform. The preform is then dried and heated until it becomes a pore free glass element with an index gradient. The sol-gel and other techniques are reviewed in U.S. Pat. No. 4,686,195 to Yamane.

Gradient index glass prepared by diffusion in inorganic oxide gel monoliths is proposed by Mukherjee, S.P., "Gradient Index Lens Fabrication Processes: A Review, in Topical Meeting on Gradient-Index Optical Imaging Systems," Honolulu, Hawaii, Optical Society of America (1981), pages Tu Al-1 to Tu Al-5. This paper identifies the following potential advantages of using sol gel precursors in the production of gradient index glass: (1) relatively large diffusion coefficients; (2) low energy consumption during most of the process; and (3) the ability to introduce a broad variety of index-modifying dopants into the sol gel preform.

U.S. Pat. No. 4,686,195 to Yamane produces gradient index glass by a sol-gel technique. This technique involves mixing a silicon alkoxide with water, a source of boron oxide, and an aqueous metal salt solution which is the source of modifier cations. This mixture forms a gel which then is placed in a solution to leach out some of the metal salts contained within it and to have other metal salts introduced into it by diffusion. The gel is then dried and sintered into glass. M. Yamane et. al, "Gradient-Index Glass Rods of $PbO.K_2O.B_2O_3.SiO_2$ System Prepared by the Sol-Gel Process," *Journal of Non Crystalline Solids*, 100, 506-10 (1988) discloses a similar process in which the concentration gradient index of cations is fixed by a reprecipitation mechanism in acetone or iso-propanol.

Shingyouchi et. al., *Electronics Letters*, 22:99 100, 1108-1110 (1986), utilizes germanium alkoxide as the index modifying cation. The index modifier is thus fully incorporated into the gel structure, and the index profile does not suffer from uncontrollable asymmetry.

First, tetramethoxy silane (a silicon alkoxide) is combined with tetraethoxy germanium (a germanium alkoxide), ethanol, water, and hydrochloric acid. The mixture forms a gel which is placed in water to leach out some of the germanium component. The gel is then washed in methanol to fix the germanium concentration gradient, dried, and sintered into gradient-index glass. Shingyouchi el. al. also uses titanium to replace germanium as the index modifying cation. The resulting glass is a 2 mm diameter rod with a $\Delta n$ of $-0.013$.

The method of Shingyouchi et. al. involves the use of only two components: silica and an index modifying oxide, such as germanium dioxide or titanium dioxide. The method can be generalized to substitute zirconium dioxide as well. These binary systems, however, yield gels with decreased porosity, making them difficult to dry and sinter without fracturing or bloating. The $SiO_2.TiO_2$ binary system tends to crystallize at elevated temperatures if the $TiO_2$ content tends to bloat at elevated temperatures, because the outside portions of the gel collapse before the inside portions, thereby trapping any released gases.

U.S. Pat. Nos. 4,797,376 and 4,902,650 to Caldwell et al. disclose a sol-gel method for producing gradient index glass in a ternary system. This process is initiated by forming a mixture of silicon alkoxide and alcohol in an aqueous solution sufficiently acidic to hydrolyze partially the silicon alkoxide. An index modifying metal alkoxide, an additional metal alkoxide, and water are then added to the mixture. This converts the metal alkoxides to a network of corresponding metal oxides suitable for gelation. A gel is then formed by molding the mixture containing the network of metal oxides. The gel is acid leached, fixed in alcohol, dried, and sintered to a transparent gradient index glass. U.S. Pat. No. 5,068,208 to Haun, et al. discloses the use of water or a mixture of water and alcohol as fixing agents in such processes.

In the processes disclosed by U.S. Pat. Nos. 4,797,376 and 4,902,650 to Caldwell, et al. and U.S. Pat. No. 5,068,208 to Haun, et al., it has been found that when fixing is carried out, for example with alcohol alone or in admixture with water, dissolved dopants may precipitate. The presence of such precipitates can adversely affect the ultimately produced gradient index glass by reducing its $\Delta n$ or creating undesirable profile shapes. Such dissolved dopants are present in the residual leaching liquid within the pores of the gel. Once precipitated, these dopants deposit on the pore surfaces of the gel and become part of the gradient index glass produced when the gel is sintered. The process of the present invention is directed to eliminating the presence of such precipitates and, accordingly, the risk that their presence might decrease the difference in refractive index ($\Delta n$) in gradient index glass.

SUMMARY OF THE INVENTION

The present invention relates to a process for making a gradient index glass from a mixture of a silicon alkoxide and alcohol in a solution sufficiently acidic to partially hydrolyze the silicon alkoxide. An index modifying metal alkoxide selected from the group consisting of alkoxides of titanium and zirconium is then added to the mixture. Water is also incorporated, preferably under agitation, to convert the metal alkoxides to a network of corresponding metal oxides suitable for gelation. The mixture containing the network of metal oxides is molded (i.e. contained) for a time sufficient to form a gel which is then acid leached to remove some of the index modifying metal oxide. After leaching, the gel is fixed to prevent further removal of index modifying metal oxide and then rinsed with a solvent to remove precipitates from the gel. The fixed gel is then dried and sintered into a transparent gradient index glass. It is particularly desirable to add also at least one additional metal alkoxide to the mixture, such as an alkoxide of aluminum, boron, or germanium, prior to addition of water.

In another aspect of the present invention, a mixture of silicon alkoxide and alcohol in a solution sufficiently acidic to partially hydrolyze the silicon alkoxide is formed, and an index modifying metal alkoxide selected from the group consisting of alkoxides of titanium and zirconium is added to the mixture. Next, water is added to the mixture, preferably under agitation, to convert the metal alkoxides to a network of corresponding metal oxides suitable for gelation. The mixture containing the network of metal oxides is then molded (i.e. contained) for sufficient time to form a gel. The contained gel is then acid leached for enough time to remove some of the index modifying metal oxide and fixed in acetone or a mixture of water and acetone. The fixed gel is then dried and sintered to form a transparent gradient-index glass. Again, at least one additional metal alkoxide, such as an alkoxide of aluminum, boron, or germanium, is added to the mixture prior to adding water.

By rinsing the gel with solvent after fixing, precipitates are removed from the gel pores. As a result, the incorporation of such precipitates in the glass is prevented. This is advantageous, because the resulting gradient-index glass is less likely to suffer a detrimental decrease in its difference in refractive index. It is also less likely to suffer a detrimental change in the profile shape. In addition, this technique affords greater control of the process.

DETAILED DESCRIPTION OF THE INVENTION

The present invention relates to a process for making a gradient-index glass from a mixture of a silicon alkoxide and alcohol in a solution sufficiently acidic to partially hydrolyze the silicon alkoxide. An index modifying metal alkoxide selected from the group consisting of alkoxides of titanium and zirconium is then added to the mixture. Water is also incorporated, preferably under agitation, to convert the metal alkoxides to a network of corresponding metal oxides suitable for gelation. The mixture containing the network of metal oxides is molded (i.e. contained) for a time sufficient to form a gel which is then acid leached to remove some of the index modifying metal oxide. After leaching, the gel is fixed to prevent further removal of index modifying metal oxide and then rinsed with a solvent to remove precipitates from the gel. The fixed gel is then dried and sintered into a transparent gradient index glass.

The present invention also relates to another process for making a gradient-index glass. In this process, a mixture of silicon alkoxide and alcohol in a solution sufficiently acidic to partially hydrolyze the silicon alkoxide is formed, and an index modifying metal alkoxide selected from the group consisting of alkoxides of titanium and zirconium is added to the mixture. Next, water is added, preferably under agitation, to the mixture to convert the metal alkoxides to a network of corresponding metal oxides suitable for gelation. The mixture containing the network of metal oxides is then molded (i.e. contained) for sufficient time to form a gel. The contained gel is acid leached for enough time to remove some of the index modifying metal oxide and fixed in acetone or a mixture of water and acetone. The fixed gel is then dried and sintered to form a transparent gradient index glass.

In accordance with the present invention, an alkoxide of silicon, diluted with alcohol, is hydrolyzed partially by adding a small amount of slightly acidic water. This use of silicon alkoxide provides $SiO_2$ to the gel which is the chosen glass former for this system.

After partial hydrolysis, at least one additional, different metal alkoxide is added. The additional alkoxide acts as a source of an index modifying metal or dopant. Alkoxides of titanium, zirconium, and mixtures thereof are suitable for this purpose. A third alkoxide, which functions as a source of a gel structure modifying metal should also be added. This can be an alkoxide of a gel structure modifying metal, such as aluminum. Other additional alkoxides can be added to produce a system that is of higher order than ternary. These include alkoxides of boron or germanium.

The addition of an aluminum alkoxide furnishes $Al_2O_3$ to the gel. Gels containing $Al_2O_3$ tend to have a lower density and a coarser microstructure when dried. The coarse structure makes the dry gel more resistant to fracture during heating and allows gaseous reaction products formed during sintering to flow freely out of the gel, thus preventing bloating. The presence of $Al_2O_3$ tends to increase the temperature at which the gel collapses into glass. As a result, reactions which cause bloating are more likely to be completed before the gel collapses. When present in a gel containing $TiO_2$ or $ZrO_2$, $Al_2O_3$ helps to reduce the rate of crystallization and increases the temperature at which crystallization occurs.

The addition of a boron alkoxide provides the gel with $B_2O_3$. The presence of $B_2O_3$ eliminates bloating which occurs during the leaching stage by lowering the sintering temperature of the center of the gel relative to outer portions of the gel. As a result, the center will sinter first and release gases to prevent them from being trapped within the collapsing gel. Also, $B_2O_3$ substantially reduces the tendency of a gel containing $TiO_2$ or $ZrO_3$ to crystallize at high temperature.

The use of germanium alkoxides furnishes $GeO_2$ which performs a function similar to $B_2O_3$, but also significantly contributes to the total index change.

Tetramethoxy silane ("TMOS") is the preferred silicon alkoxide. The preferred source of $B_2O_3$ is triethyl borate or tributyl borate. The preferred sources of $GeO_2$, $ZrO_2$, and $TiO_2$ are the ethoxides, propoxides, or butoxides of germanium, zirconium, and titanium, respectively. The preferred source of $Al_2O_3$ is aluminum di(sec-butoxide) acetoacetic ester chelate. The metal oxides ($SiO_2$, $TiO_2$, $ZrO_2$, $Al_2O_3$, and $GeO_2$) are formed from their corresponding metal alkoxides by hydrolysis and polycondensation reactions. These reactions lead to the formation of a highly porous oxide gel.

The amount of $SiO_2$, in the gel should be between 60 and 98 mole %. Amounts below 60 mole % result in a gel which is too weak to withstand all of the processing steps. Amounts greater than 98 mole % will not achieve useful refractive index changes.

For gels incorporating $TiO_2$ as the main index modifier, the amount of $TiO_2$ in the gel should be at least 0.1 mole % but less than 25 mole %. For gels incorporating $ZrO_2$ as the main index modifier, the amount of $ZrO_2$ should also be at least 0.1 mole % but less than 25 mole %. Gels containing more than 25 mole % $TiO_2$ or $ZrO_2$ tend to dissolve during the leaching stage or crystallize during the sintering stage.

When $Al_2O_3$ is used as gel structure modifier, the amount of $Al_2O_3$ should be between 1 and 25 mole %. The amount of $B_2O_3$ present should be less than 10 mole percent, and the amount of $GeO_2$ should be less than 10 mole %.

A mixture of silicon alkoxides, titanium alkoxides, and aluminum alkoxides is one preferred embodiment of the present invention. It is desirable to mix these alkoxides in amounts which will ultimately form a gradient index glass containing 89 to 98 mole % $SiO_2$, 0 to 5 mole % ½($Al_2O_3$), and 0.1 to 6 mole % $TiO_2$. A composition of 85 mole % $SiO_2$, 10 mole % ½($Al_2O_3$), and 5 mole % $TiO_2$ is particularly useful.

After a mixture of a silicon alkoxide, an index modifying metal alkoxide, and at least one additional metal alkoxide element is prepared, it is stirred and diluted with water to convert the metal alkoxides to a network of the corresponding metal oxides suitable for gelation. The mixture containing the network of metal oxides is then placed in a mold and allowed to set for sufficient time to form a gel. Once gelled, the mixture is aged at 20 to 100° C., preferably 50° C., for a time period of one hour to several weeks.

After aging, the gel is washed with water to remove alcohols or any additives used in the gel forming process. Such washing can be repeated several times, if needed, to achieve this objective. As a result of such washing, more desirable profile shapes are achieved in the resulting glass.

Next, the gel is placed in an acid leaching bath for a period of 15 minutes to 6 hours, preferably 16 minutes to leach out some of the index modifying metal oxide from the gel. Generally, acid leaching is carried out at 0 to 90° C., preferably 21° C. The acid leaching bath contains water and an acid selected from the group consisting of an inorganic acid, a dicarboxylic acid, and mixtures thereof. Suitable inorganic acids include hydrochloric acid, sulfuric acid, nitric acid, or mixtures thereof. Useful dicarboxylic acids include oxalic acid, malonic acid, and mixtures thereof. In manufacturing gradient index glass from an alkoxide mixture, the acid leaching bath removes index modifying metals like titanium and/or zirconium from the gel.

Next, the gel is placed in a fixing bath to arrest leaching. The fixing bath can contain water, an alcohol containing 1–4 carbon atoms, acetone, or mixtures thereof. Widely ranging amounts of the fixing agents can be utilized.

For fixing baths containing a mixture of acetone and water, the ratio of acetone to water is desirably selected to result in a maximum difference in refractive index in the gradient-index glass or to produce gradient index glass having a substantially parabolic shape.

Where the fixing bath contains alcohol, ethanol and methanol are particularly suitable. Fixing baths containing from 0 volume % up to 100 volume % alcohol are suitable. To achieve maximum $\Delta n$ values, the fixing bath should contain an aqueous solution of 5 to 60 volume percent alcohol. Substantially parabolic configurations are produced when the fixing bath contains an aqueous solution of 0 to 40 volume percent alcohol. The combination of a substantially parabolic configuration and maximum $\Delta n$ values are achieved with a fixing bath formed from an aqueous solution of 20 to 40 volume percent alcohol.

The fixed gel is next rinsed with a solvent to remove precipitates from the gel pores. A suitable solvent is water. This treatment is particularly necessary where the fixing agent contains an alcohol or acetone or other fixing agent which causes precipitation. In many cases, the use of a solvent treatment will increase the difference in refractive index ($\Delta n$) in the resulting gradient index glass.

The fixed gel is dried to produce a porous oxide body with a greater percentage of index modifying dopants at its center than at its edge. Drying can be carried out at 21 to 100° C., preferably 50° C., for at least two days, preferably three days, depending on the size of the gel.

The dried gel is sintered into a transparent gradient index glass by heating the gel to a temperature between 800 to 1600° C. for a period of 8 to 24 hours, preferably 20.5 hours. One suitable sintering schedule comprises heating by 30° C. per hour to 600° C. in air, heating by 50° C. per minute to 1100° C. in oxygen, heating by 20° C. per minute to 1500° C. in helium, holding for three minutes, and cooling to room temperature.

EXAMPLES

The following examples are illustrative of the present invention.

Example 1

15.63 ml of dimethyl formamide, 15.63 ml of methanol, 9.68 ml of tetramethyl orthosilicate, and 1.18 ml of an 0.1 M aqueous solution of hydrochloric acid were stirred together for 15 minutes. 1.15 ml of titanium isopropoxide and 2.33 grams of aluminum di(sec-butoxide) acetoacetic ester chelate then were added and the mixture was stirred for 1 hour. 4.39 ml of water then was added and the mixture was stirred for 5 minutes. 4 ml of the resulting solution was poured into each of eleven 11 mm diameter×50 mm polypropylene test tubes which were immediately capped. The solution inside the test tubes formed a stiff gel within 4.5 hours at room temperature. The gels were kept closed inside the test tubes while they were aged for 2½ days at 50° C.

The gels were placed in glass test tubes containing 50 ml of water with that liquid being changed three times every 12 hours so that the total time in water was 47 hours. The gels were then leached in 50 ml of a 3M $H_2SO_4$ solution for 15 minutes. The test tubes were rotated end over end to provide agitation.

The acid was removed, and the gels were fixed in 50 ml of fixing solution (i.e., 100 volume % methanol in this example) while the test tubes were rotated. The solution was replaced with fresh solution twice each day. 24 hours later, the methanol was removed from the test tubes, and the gels were washed with 50 ml water for 24 hours to remove precipitates. The gels were then dried in the test tubes in an oven at 50° C. for 1½ days.

Next, the gels were heated at 30° C. per hour to 600° C. in air, held for 3 hours, heated at 50° C. per minute to 1100° C. in an oxygen atmosphere, heated at 20° C. per minute to 1485° C. in a helium atmosphere and held for 3 minutes. The resulting glass rods were removed from the furnace and cooled to room temperature.

The rods were 3.7 mm in diameter, about 13 mm long, and were composed of a transparent, gradient index titania-silica glass which was free from defects. The rods had a total index change $\Delta n$ of $-0.0092$.

Example 2

The process of Example 1 was repeated except that the fixing agent was an aqueous solution of 67% acetone, and there was no water wash after methanol fixing. The gradient-index glass rods formed after sintering had a diameter of 3.7 mm and a length of about 13 mm. The cross section of the rods did not have a parabolic $\Delta n$ versus R curve.

Example 3

The process of Example I was repeated except that the fixing agent was an equeous solution of 33% acetone, and there was no water wash after methanol fixing. The gradient-index glass rods produced by the process had a diameter of 3.7 mm and a length of about 13 mm. The rods had a total index change $(\Delta n)$ of $-0.0146$.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A process for making a gradient-index glass comprising:

forming a mixture of a silicon alkoxide and an alcohol in a solution sufficiently acidic to partially hydrolyze the silicon alkoxide;

adding to the mixture an index modifying metal alkoxide selected from the group consisting of alkoxides of titanium and zirconium;

adding water to the mixture to convert the metal alkoxides to a network of corresponding metal oxides suitable for gelation;

containing the mixture containing the network of metal oxides for sufficient time to form a gel;

acid leaching the contained gel for sufficient time to remove some of the index modifying metal oxide;

fixing the gel in acetone or a mixture of water and acetone;

drying the fixed gel; and sintering the dried gel into a transparent gradient-index glass.

2. A process according to claim 1 further comprising: adding to the mixture at least one additional metal alkoxide element selected from the group consisting of alkoxides of aluminum, boron, and germanium prior to said adding water.

3. A process according to claim 2 further comprising: washing the contained gel with water before said acid leaching.

4. A process according to claim 2, wherein the silicon alkoxide is added in an amount sufficient to produce a gradient-index glass containing 60 to 98 mole percent silicon oxide.

5. A process according to claim 2, wherein the index modifying alkoxide is added in an amount sufficient to produce a gradient-index glass containing 0.1 to 25 mole percent of corresponding index modifying oxide.

6. A process according to claim 2, wherein the additional metal alkoxide element is added in an amount sufficient to produce a gradient index glass containing between 1 and 25 mole percent of corresponding additional metal oxide element.

7. A process according to claim 2, wherein said acid leaching is carried out in a bath comprising water and an acid selected from the group consisting of an inorganic acid, a dicarboxylic acid, and mixtures thereof.

8. A process according to claim 7, wherein the acid is an inorganic acid selected from the group consisting of hydrochloric acid, sulfuric acid, nitric acid, and mixtures thereof.

9. A process according to claim 7, wherein the acid is a dicarboxylic acid selected from the group consisting of oxalic acid, malonic acid, and mixtures thereof.

10. A process according to claim 2, wherein the index modifying metal alkoxide is titanium alkoxide and the at least one additional metal alkoxide is aluminum alkoxide.

11. A process according to claim 10, wherein the glass comprises:
89 to 98 mole % $SiO_2$,
0.1 to 6 mole % $TiO_2$; and
0 to 5 mole % ½($Al_2O_3$).

12. A process according to claim 1, wherein said fixing is carried out in acetone.

13. A process according to claim 1, wherein said fixing is carried out in a mixture of acetone and water.

14. A process according to claim 13, wherein said fixing is carried out in a mixture of acetone and water which contains acetone and water in a ratio that will result in a maximum difference in refractive index ($\Delta n$) in the gradient index glass.

15. A process according to claim 13, wherein said fixing is carried out in a mixture of acetone and water which contains acetone and water in a ratio that will result in gradient index glass having a substantially parabolic shape.

16. A process for making a gradient-index glass comprising:
forming a mixture of a silicon alkoxide and an alcohol in a solution sufficiently acidic to partially hydrolyze the silicon alkoxide;
adding to the mixture an index modifying metal alkoxide selected from the group consisting of alkoxides of titanium and zirconium;
adding water to the mixture to convert the metal alkoxides to a network of corresponding metal oxides suitable for gelation;
containing the mixture containing the network of metal oxides for sufficient time to form a gel;
acid leaching the contained gel for sufficient time to remove some of the index modifying metal oxide;
fixing the gel to prevent further removal of the index modifying metal oxide from the gel;
rinsing the fixed gel with a solvent to remove precipitates from the gel;
drying the fixed gel; and
sintering the dried gel into a transparent gradient-index glass.

17. A process according to claim 16, wherein the solvent is water.

18. A process according to claim 16, wherein said fixing is carried out with a material which causes precipitation formation.

19. A process according to claim 18, wherein said fixing is carried out with alcohol alone, alcohol mixed with water, acetone alone, or acetone mixed with water.

20. A process according to claim 16, wherein said rinsing results in an increased difference in refractive index in the gradient-index glass.

21. A process according to claim 16 further comprising:
adding to the mixture at least one additional metal alkoxide selected from the group consisting of alkoxides of aluminum, boron, and germanium prior to said adding water.

22. A process according to claim 21, wherein the silicon alkoxide is incorporated in the mixture in an amount sufficient to produce a gradient index glass containing 60 to 98 mole percent silicon oxide.

23. A process according to claim 21, wherein the index modifying metal alkoxide is titanium alkoxide and the at least one additional metal alkoxide is aluminum alkoxide.

24. A process according to claim 23, wherein the glass comprises:
89 to 98 mole % $SiO_2$;
0.1 to 6 mole % $TiO_2$; and
0 to 5 mole % $\frac{1}{2}(Al_2O_3)$.

25. A process according to claim 17, wherein said fixing is carried out in acetone.

26. A process according to claim 25, wherein said fixing is carried out in a mixture of acetone and water.

27. A process according to claim 26, wherein the mixture of acetone and water contains acetone and water in a ratio that will result in a maximum difference in refractive index ($\Delta$) in the gradient-index glass.

28. A process according to claim 26, wherein the mixture of acetone and water contains acetone and water in a ratio that will result in gradient-index glass having a substantially parabolic shape.

29. A process according to claim 17 further comprising:
washing the contained gel with water before said acid leaching.

30. A process according to claim 17, wherein the index modifying alkoxide is added to the mixture in an amount sufficient to produce a gradient-index glass containing 0.1 to 25 mole percent of corresponding index modifying oxide.

31. A process according to claim 17, wherein the additional metal alkoxide element is added to the mixture in an amount sufficient to produce a gradient index glass containing between 1 and 25 mole percent of corresponding additional metal oxide element.

32. A process according to claim 17, wherein said acid leaching is carried out in a bath comprising water and an acid selected from the group consisting of an inorganic acid, a dicarboxylic acid, and mixtures thereof.

33. A process according to claim 32, wherein the acid is an inorganic acid selected from the group consisting of hydrochloric acid, sulfuric acid, nitric acid, and mixtures thereof.

34. A process according to claim 32, wherein the acid is a dicarboxylic acid selected from the group consisting of oxalic acid, malonic acid, and mixtures thereof.

* * * * *